Oct. 20, 1964
C. VAN DER LELY
3,153,457
SKELETON TYPE MOLDBOARD PLOW
Filed March 30, 1961
5 Sheets-Sheet 1
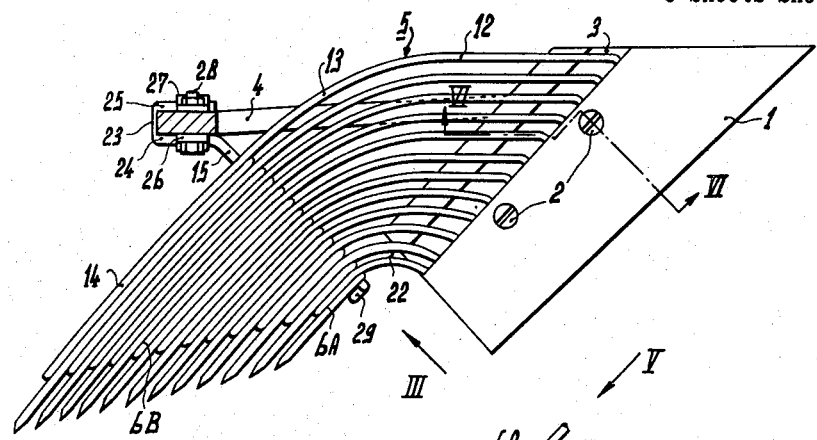
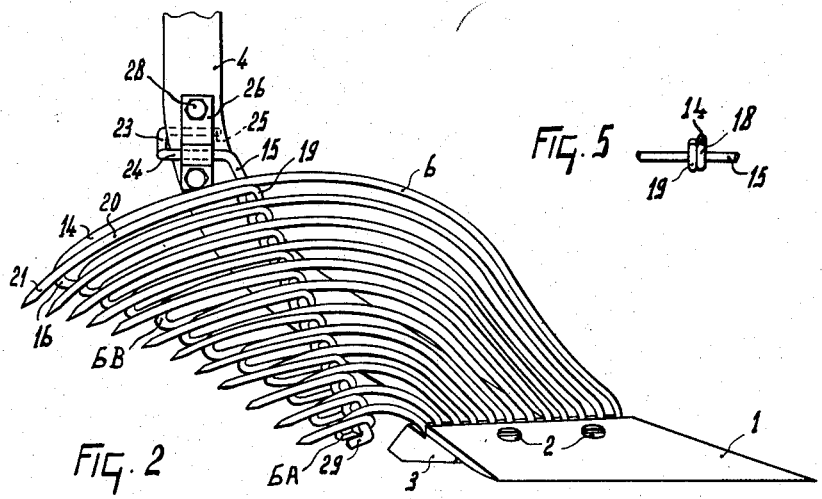
INVENTOR.
CORNELIS VAN DER LELY
BY
Mason, Mason & Albright
ATTORNEYS

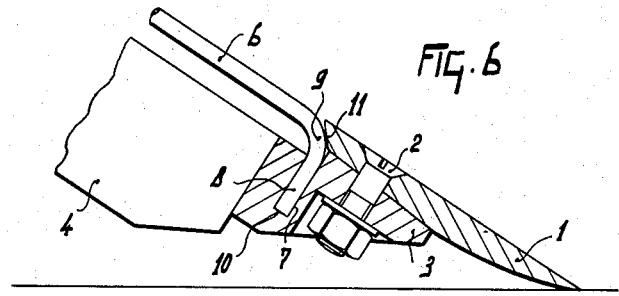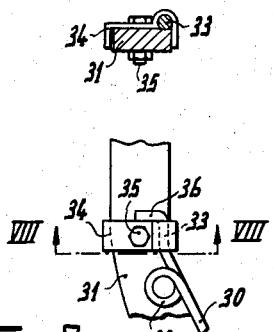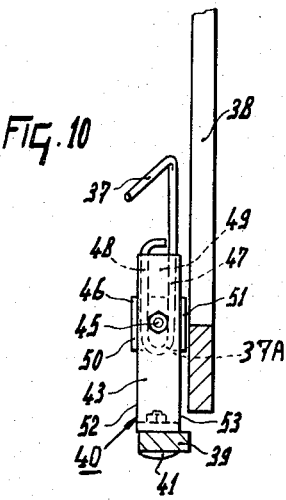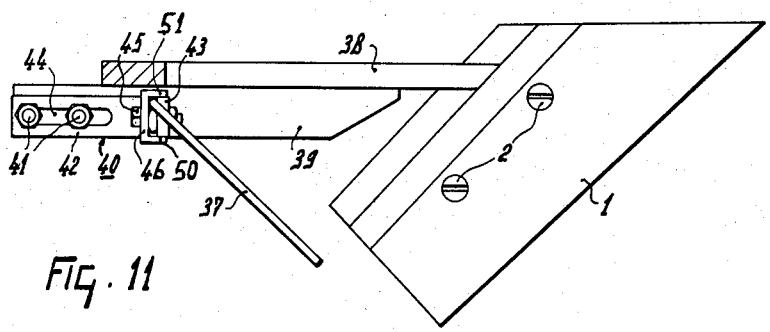

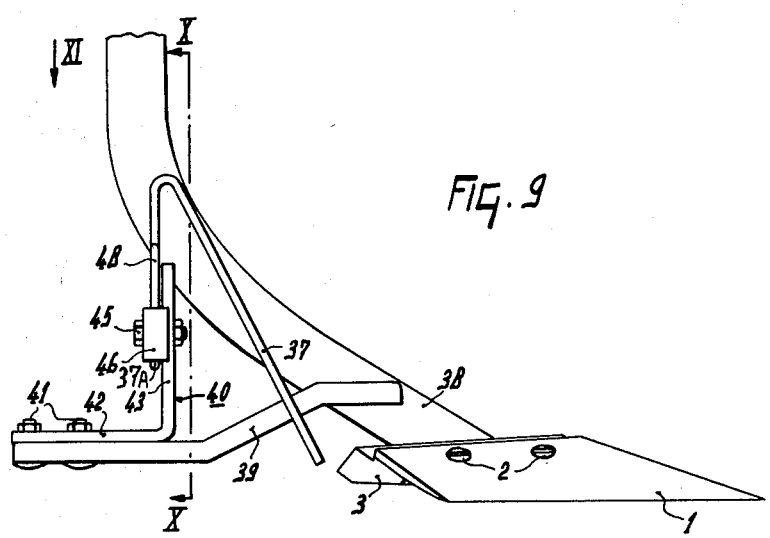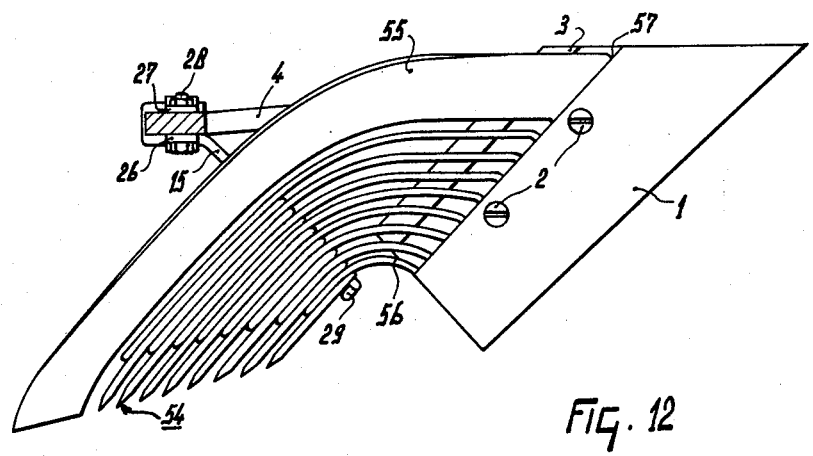

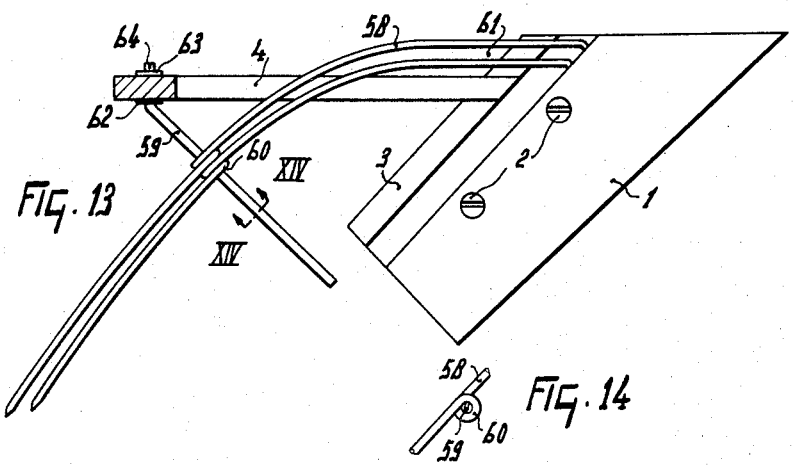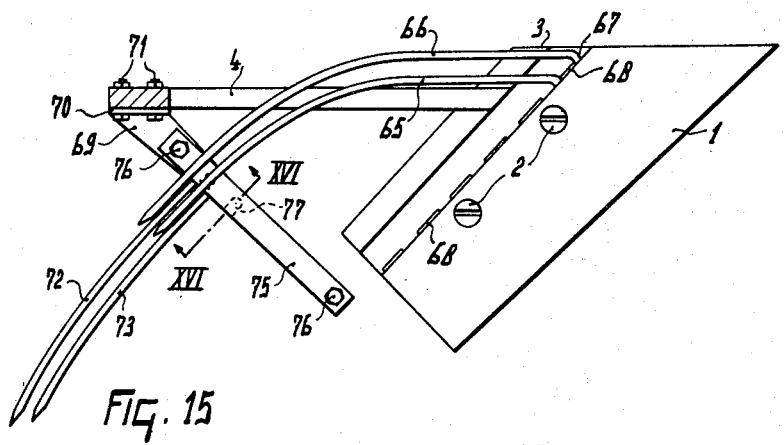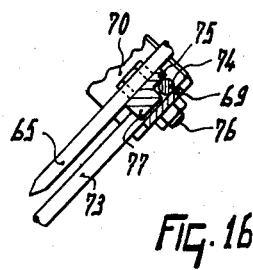

Oct. 20, 1964  C. VAN DER LELY  3,153,457
SKELETON TYPE MOLDBOARD PLOW
Filed March 30, 1961  5 Sheets-Sheet 5

INVENTOR.
CORNELIS VAN DER LELY
BY
Mason, Mason & Albright
Attorneys

United States Patent Office 3,153,457
Patented Oct. 20, 1964

3,153,457
SKELETON TYPE MOLDBOARD PLOW
Cornelis van der Lely, Zug, Switzerland, assignor to C. van der Lely N.V., Maasland, Netherlands, a limited-liability company of the Netherlands
Filed Mar. 30, 1961, Ser. No. 99,571
Claims priority, application Netherlands Apr. 14, 1960
11 Claims. (Cl. 172—756)

This invention relates to a moldboard for a plow.

According to the present invention, there is provided a moldboard for a plow, wherein at least part of the moldboard surface is formed by spring steel bars which are disposed adjacent one another.

For a better understanding of the invention and to show how the same may be carried into effect, reference will now be made by way of example to the accompanying drawings, in which:

FIGURE 1 is a plan of a part of a moldboard plow,

FIGURE 2 is a side elevation of the part shown in FIGURE 1,

Figure 18:
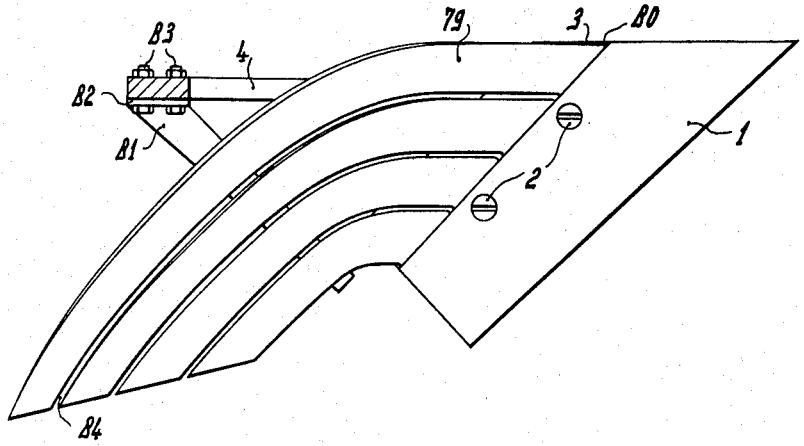
Figure 19:
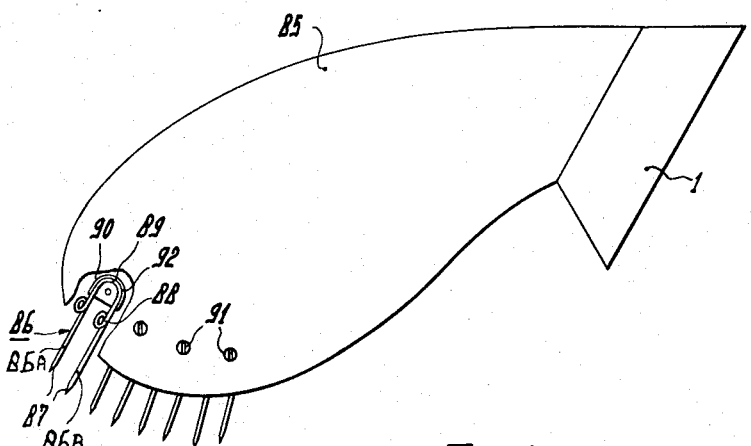

FIGURE 3 is a side view of a detail, as seen in the direction of the arrow III in FIGURE 1, FIGURE 4 is a side view similar to FIGURE 3, but showing a different detail, also as seen in the direction of the arrow III in FIGURE 1, FIGURE 5 is an elevation of the detail shown in FIGURE 3, as seen in the direction of the arrow V in FIGURE 3, FIGURE 6 is a vertical section through the part shown in FIGURE 1, taken along the line VI—VI in FIGURE 1, FIGURE 7 shows a modification of a further detail of the part of a plow, FIGURE 8 is a section of the modification shown in FIGURE 7, taken along the line VIII—VIII in FIGURE 7, FIGURE 9 is a side elevation similar to FIGURE 2, but showing a further modification, various parts having been removed for the sake of clarity, FIGURES 10 is a vertical section of the further modification shown in FIGURE 9, taken along the line X—X in FIGURE 9, FIGURE 11 is a plan of the further modification shown in FIGURE 9, as seen in the direction of the arrow XI in FIGURE 9, FIGURE 12 is a plan of a second embodiment of the part of a plow, FIGURE 13 is a plan of a third embodiment of the part of a plow, various elements having been removed for the sake of clarity, FIGURE 14 is a section of a detail of the third embodiment, taken along the line XIV—XIV in FIGURE 13, FIGURE 15 is a plan of a fourth embodiment of the part of a plow, various elements having been removed for the sake of clarity, FIGURE 16 is a section of a detail of the fourth embodiment, taken along the line XVI—XVI in FIGURE 15, FIGURE 17 is a cross-section of a further detail which may be used in any of the embodiments shown in FIGURES 1–16, FIGURE 18 is a plan of a fifth embodiment of the part of a plow, and FIGURE 19 is a plan of a sixth embodiment of the part of a plow.

Referring first to FIGURES 1, 2 and 6, there is shown a plow share 1 which is secured by bolts 2 to a shoe 3. A plow beam 4 is also secured to the shoe 3, the plow beam being provided in known manner with fastening means for coupling the plow to a tractor or a similar vehicle for drawing the plow over the ground. The plow has a moldboard 5 which is formed from spring steel bars 6 of circular cross-section. The bars 6 are connected at one end to the shoe 3. For this purpose, the shoe 3 is formed with holes 7 into which bent-over ends 8 of the bars 6 are inserted. Each end 8 is connected by a curved portion 9 with the remainder of the respective bar 6. The bars 6 are held in position by the plow share 1, since an edge 11 of the share is beveled and bears on the curved portion 9. The ends 8 of the bars are therefore secured between the shoe 3 and the plow share 1.

It may be seen from FIGURE 1 that, viewed from above, each bar 6 has a substantially straight portion 12 extending from the shoe 3, and a curved portion 13 establishing a connection between the substantially straight portion 12 and a second substantially straight portion 14. The portion 14 extends over a supporting member in the form of a rod 15 and, at a point spaced from the supporting rod 15, the bar is bent through 180° at 16. The bend 16 forms a connection between the substantially straight portion 14 and a portion 17, the portion 17 extending back towards the supporting rod 15. The supporting rod 15 extends transversely to the bars 6.

FIGURES 3 and 4 show side elevations of bars 6A and 6B, respectively, and it may be seen from these figures that the portions 14 and 17 and the bend 16 of each bar 6, constitute a loop contained in a plane substantially perpendicular to the supporting rod 15. As shown in FIGURE 5, the portion 17 of each bar 6 is looped once around the supporting rod 15 at 18, then looped a half turn around the supporting rod 15 at 19. A portion 20 extends from the loop 19 beside the portion 14. The free end 21 of the portion 20 is formed as a point. It will be seen from FIGURE 5 that a part of the portion 14 bears on the loop 18.

It will be appreciated that the point 21 of each bar 6 is substantially co-planar with the corresponding substantially straight portion 14. The lengths of the loops formed by the substantially straight portions 14 and 17 and the curved portions 16, gradually increase from one bar 6 to the next bar 6, as is clearly shown in FIGURE 2 where, for example, the loop of the bar 6B is longer than the loop of the bar 6A. The lengths of the straight portions 20 correspondingly increase from one bar to the next.

It will be seen from FIGURE 1 that the portions 12 and 13 of the bars 6 are spaced apart from each other so as form gaps 22 therebetween. In the side view shown in FIGURE 2, the loops including the portions 14 and 17 are shown spaced apart from the portions 20 of the adjacent bars, for the sake of clarity. However, in practice, these loops lie close to one another. Since each portion 20 is disposed for the major part of its length at a lower level than the associated portion 14, as shown in FIGURES 3, 4 and 5, it will be appreciated that gaps are also formed between the portions 14.

An end 23 of the supporting rod 15 is bent to form a substantially U-shaped portion having limbs 24 and 25. The limb 24 is located on one side of the beam 4 and the limb 25 is located on the other side thereof, the two limbs being held in contact with the beam 4 with the aid of clamps 26 and 27 respectively. The clamps are secured to the beam 4 by bolts 28. As is shown in FIGURE 2, the limbs 24 and 25 are located at different levels. The limb 24 is turnable in the portion of the clamp 26 which is bent around the limb. The supporting rod 15 is preferably made from spring steel, so that the part of the supporting rod around which the bars 6 are bent, is capable of turning about the axis of the limb 24, which is thus torsionally stressed. The free end 29 of the supporting rod 15 is bent through 90° so that the bars 6 are retained on the rod 15. Since the bars 6 and the supporting rod 15 are made from spring steel, the moldboard 5 formed thereby is capable of resilient deflection as a whole with respect to the share 1 and beam 4, while, at the same time, the bars 6 are also capable of deflection relative to one another. The effective surface of the moldboard, which surface is formed by the bars 6, is of substantially the same shape as that of known moldboards.

During operation, a furrow slice is cut from the ground by the coulter (not shown) and the plow share 1. The furrow slice rises over the plow share 1 during the movement of the plow along theg round, and subsequently rises over the moldboard 5. The furrow slice is turned over transversely to the direction of travel by the moldboard.

The moldboard described above has the advantage that a sturdy but light-weight structure is produced. Also, there is less contact between the soil and the moldboard than with conventional moldboards, so that the effect of friction between the soil and the moldboard will, in general, be smaller than that experienced with conventional plows. During the operation of the plow, the furrow slice moves over the moldboard in a direction which approximates with that of the bars 6.

A modification of the fastening of a supporting member in the form of a rod to the plow beam, is shown in FIGURES 7 and 8. In this modification, a coil 32 is formed in a supporting rod 30 near the point where the latter is secured to a plow beam 31. A portion 33 of the supporting rod 30 is clamped to the plow beam 31 by a clamp 34 and a bolt 35. The free end 36 of the supporting rod 30 is bent through 90° and extends along the upper side of the clamp 34. The portion 33 is inclined to the portion of the supporting rod 30 in which the coil 32 is formed, so that axial displacement of the portion 33 is prevented by the bent-over end 36 and the bend between the portion 33 and the remainder of the supporting rod 30. The provision of the coil 32 allows for deflection of the supporting rod 30 against resilient opposition during operation. It will be appreciated that a plurality of coils may be formed one beside the other in place of the single coil 32.

A further modification of the fastening of a supporting member in the form of a rod to the plow beam, is shown in FIGURES 9, 10 and 11. In this modification, a bracket 39 is secured to a plow beam 38. A second bracket 40 is bolted to the bracket 39 by bolts 41. The bracket 40 comprises two substantially perpendicular portions 42 and 43, the portion 42 being formed with a slot 44 through which are passed the bolts 41. In the portion 43, there is formed a hole through which a bolt 45 is passed. The bolt 45 also passes through a hole in a U-shaped clamp 46, so that a supporting rod 37 is clamped tight to the support 40 by the bolt 45. The supporting rod 37 is bent at 37A through an angle of 180°, so that two portions 47 and 48 are formed which are spaced and parallel. Thus a slot 49 is formed, through which the bolt 45 is passed. The portions 47 and 48 are enclosed between the clamp 46 and the portion 43 of the bracket 40. Limbs 50 and 51 of the U-shaped clamp 46 extend along the portions 47 and 48, and along the edges 52 and 53 of the portion 43. Thus turning of the supporting rod 37 about the bolt 45 is prevented. The bars forming the surface of the moldboard may be supported by the supporting rod 37 in the manner described above for the bars 6 shown in FIGURES 1 to 5. When the bolt 45 is loosened, the supporting rod 37 can be displaced along the portion 43 of the bracket 40, and can be refixed in a new position by tightening the bolt 45. The bracket 40 is also arranged to be moved along the bracket 39 and to be fixed in a number of positions by the bolts 41. The movement of the supporting rod 37 with respect to the portion 43 of the bracket, is transverse to the bars which form the surface of the moldboard, whereas the movement of the bracket 40 with respect to the bracket 39, is approximately parallel to the direction of the bars. Thus, both such movements alter the shape of the flexible moldboard, so that the shape can be altered to match the type of soil to be plowed.

Referring now to FIGURE 12, there is shown a plow share 1 to which is attached a moldboard 54. An upright rim of the moldboard is formed by a rectangular-section bar 55. The remainder of the moldboard is formed by circular-section bars 56 which are arranged in the same manner as the bars 6 referred to in the embodiment of FIGURES 1 to 5. Various parts of the second embodiment shown in FIGURE 12 are designated by the same reference numerals as the corresponding parts of the embodiment shown in FIGURES 1 to 5. In order to secure the rectangular-section bar 55 to the plow shoe 3, an end 57 of the bar is bent and is received in a slot provided in the shoe. The end 57 is then clamped between the shoe 3 and the share 1 in the same manner as the bars 56.

Referring now to FIGURES 13 and 14, there is shown a third embodiment of a moldboard, constituted by bars 58 similar to the bars 6 of the first embodiment. Only two bars 58 are shown in FIGURE 13, but it will be apperciated that a plurality of bars is provided to form a moldboard of substantially conventional shape. Various parts of the third embodiment shown in FIGURES 13 and 14 are desginated by the same reference numerals as the corresponding parts of the embodiment shown in FIGURES 1 to 5.

The bars 58 are secured to the shoe 3 in the manner described above for the bars 6. The bars extend from the shoe 3 to a supporting member in the form of a rod 59, where they are coiled around the supporting rod at 60, as is shown in FIGURE 14. The bars extend outwardly from the supporting rod 59, and transversely thereto, to form the free edge of the moldboard. The free ends of the bars are pointed. It will be seen from FIGURE 13 that the bars 58 are spaced apart to form gaps 61 therebetween. The supporting rod 59, which is of circular cross-section, is passed through a hole formed in the plow beam 4. An integral shoulder 62 is formed near the end of the supporting rod 59, and the rod is retained in position by a washer 63 on the other side of the beam 4, and a pin 64. Thus the supporting rod 59 cannot move axially in the hole in the beam 4. The supporting rod 59 is, however, capable of angular movement within the hole in the beam 4 and, since the bars 58 are made of resilient material, the moldboard is capable of moving against resilient opposition during operation, while, at the same time, the bars 58 are also capable of moving with respect to one another.

FIGURES 15 and 16 illustrate a fourth embodiment of a moldboard. As in the third embodiment, only two bars are shown, but in practice a plurality of bars is provided to form a complete moldboard. Various parts of the fourth embodiment are designated by the same reference numerals as the corresponding parts of the first embodiment. Referring now to FIGURES 15 and 16, two portions 65 and 66 are bent from a single bar of spring steel. The connection between the portions 65 and 66 is formed by a curved portion 67 which is bent in a plane transverse to the portions 65 and 66. The curved portion 67 is received in a slot 68 formed in the shoe 3, and is held in place by the plow share 1 in the manner described above. The portions 65 and 66 of all the bars together constitute a first group of bars which extend over a supporting member in the form of an arm 69. The supporting arm 69 consists of a flat strip extending transversely to the bars and having a bent-over end 70 which is secured to the plow beam 4 by bolts 71. Portions 72 and 73 are bent from a single bar of spring steel, and are secured to the supporting arm 69. The portions 72 and 73 are joined by a bent portion 74 (FIGURE 16) which is clamped between the supporting arm 69 and a plate 75 with the aid of bolts 76 passing therethrough. Projections 77 are formed integrally with the plate 75 and extend between the two portions 72 and 73 of each bar. The portions 72 and 73 constitute a second group of bars which extend outwardly from the supporting arm 69.

Referring now in particular to FIGURE 16, it will be apparent that each of the first group of bars bears on the plate 75. Alternatively, the bars may be arranged so that, when they are in an unstressed condition, they are spaced from the plate 75. During operation the first group of bars deflects against resilient opposition, the deflection being limited by the supporting arm 69 and the plate 75.

As in the previously described embodiments, the bars are spaced from one another and extend in the direction, or substantially in the direction, of movement of the furrow slice during operation. The moldboard produced is flexible and may deflect against resilient opposition during operation, while the individual bars may move with respect to one another.

Each of the moldboards described above is formed from, or has a part formed from, resilient steel bars, for example the bars 6 of the first embodiment. These bars are preferably made with as smooth a surface as possible to facilitate the movement of the furrow slice over the moldboard and thus to produce a good turning action. FIGURE 17 shows a cross section of a wire 6, and illustrates how the smooth surface may be obtained. The wire 6 is coated with, for example, a smooth synthetic plastic coating 78.

Referring now to FIGURE 18, there is shown a fifth embodiment of a moldboard. Various parts of the plow are designated by the same reference numerals as the corresponding parts in the previously described embodiments. The moldboard is formed by a number of flat, rectangular-section bars 79. The ends 80 of the bars 79 are bent over and are received in slots formed in the shoe 3, similar to the slots shown in FIGURE 15, and the ends 80 are retained in position by the plow share 1. The bars 79 are made from spring steel, and extend from the plow share 1 over a supporting member 81, gaps 84 being left between the bars when they are in an unstressed state. The supporting member 81 is secured to the plow beam 4 by bolts 83 passing through a bent-over end 82, and extends transversely to the bars 79. The supporting member 81 is preferably also made from a flat, rectangular-section bar of spring steel. The bars 79 either bear directly on the supporting member 81, or they are aranged so that they are spaced therefrom when they are in an unstressed state.

During operation, both the bars 79 and the supporting member 81 are capable of deflection against resilient opposition. The bars 79 are also capable of moving with respect to each other during operation. The bars 79 extend approximately in the direction in which the furrow slice will move over the moldboard in operation, and the shape of the moldboard is substantially the same as the shape of conventional moldboards.

Referring lastly to FIGURE 19, there is shown a sixth embodiment of a moldboard. The major part of the surface of the moldboard is formed by a plate 85 similar in the shape to conventional moldboards. On the rear edge (with reference to the direction of travel in operation) of the plate 85, there are arranged resilient bars 86. A single spring steel bar 86 is bent at 89 through 180°. In each of the spaced, parallel limbs 86A and 86B so produced, a loop 88 is formed. The bend 89 is clamped between the plate 85 and a bracket 90 with the aid of a bolt 91. The bars 86 are prevented from moving axially by a rim 92 formed on the bracket 90, and their ends 87 are pointed. The bars 86 are thus secured to the plate 85 so that their limbs 86A and 86B effectively form a continuation of the plate at the place where, in operation, the furrow slice cut by the plow share leaves the moldboard.

In operation, with the moldboards described above, the furrow slice cut by the plow share makes less contact with the moldboard than with conventional plows. Therefore the draw-bar horsepower required to move the plow along the ground is less than with conventional plows. With the above-described moldboards, the furrow slice is deposited uniformly on the ground, and the scraping action produced by the pointed ends of the bars, produces a uniform surface structure of the furrow slice. In the event of wear, the worn parts of the moldboards may be individually replaced, without the necessity for renewing the whole moldboard.

In operation, the moldboards can deflect under the action of the furrow slice which is being turned, the deflection being against resilient opposition, so that, in general, no permanent deformation results. In addition, the moldboards described above have the advantage that their shape may be adjusted (with the aid of the modification shown in FIGURES 9, 10 and 11) in order to accommodate different soil conditions.

What I claim is:

1. A plow comprising a plow share, a series of bars, each of said bars having a substantially straight first portion with one end adjacent to the plow share, a curved second portion, a substantially straight third portion, and a terminal portion with resilient connecting means connecting said third portion with said terminal portion, said terminal portion being spaced apart from and overlapping said third portion at said connecting means to form gaps between corresponding portions of said bars, a plow beam extending from said plow share, and a supporting member intermediate said terminal portion and said first portion connected to said plow beam, said supporting member supportably and slidably retaining said series of bars whereby the surface presented by bars conforms substantially to a moldboard shape.

2. A plow which comprises a plow share, a series of resilient bars, each of said bars having a subsantially straight first portion extending from said plow share, a curved second portion, a substantially straight third portion, and a terminal portion, a plow beam extending from said plow share and inter-connected thereto, a supporting member intermediate said terminal portion and said first portion connected to said plow beam, said supporting member supportably and slidably retaining said series of bars, whereby the surface presented by said bars conform substantially to a moldboard shape.

3. A plow which comprises a plow share, a series of resilient bars, each of said bars having a substantially straight first portion extending from said plow share, a curved second portion, a substantially straight third portion, a terminal portion, and a loop portion inter-connecting said third portion and said terminal portion, a plow beam extending from said plow share and inter-connected thereto, a supporting member connected to said plow beam, said supporting member supportably engaging said series of bars by receipt of same in said loop portions of said bars, the surface presented by said bars conforming substantially to a moldboard shape.

4. A plow which comprises a plow share, a series of resilient bars, each of said bars having a substantially straight first portion extending from said plow share, a curved second portion, a substantially straight third portion, a terminal portion, and a double loop portion interconnecting said third portion and said terminal portion, at least one of said loops of said double loop portion being elongated, a plow beam extending from said plow share and inter-connected thereto, a supporting member connected to said plow beam, said supporting member supportably engaging said series of bars by receipt of same in said double loop portion of said rods, the surface presented by said bars conforming substantially to a moldboard shape.

5. A plow which comprises a plow share, a series of resilient bars, each of said bars having a substantially straight first portion extending from said plow share, a curved second portion, substantially straight third portion, and a terminal portion, a plow beam extending from said plow share and inter-connected thereto, a supporting member intermediate said terminal portion and said first portion hingedly connected during operation to said plow beam, said supporting member supportably and suitably retaining said series of bars, whereby the surface presented by said bars substantially conforms to a moldboard shape which is resiliently deflectable with relation to said plow share and said beam.

6. A plow which comprises a plow share, a shoe secured to said plow share, a series of bars, each of said bars having a substantially straight first portion extending from said plow share with one end secured by said shoe, a curved second portion, a substantially straight third portion, and a terminal portion, a plow beam connected to said shoe, a resilient supporting member intermediate said terminal portion and said first portion connected to said plow beam, said supporting member supportably and slidably retaining said series of bars whereby the surface presented by said bars conforms substantially to a moldboard shape.

7. A plow which comprises a plow share, a series of resilient bars, each of said bars having a substantially straight first portion extending from said plow share, a curved second portion, and a substantially straight third portion, a plow beam extending from said plow share inter-connected thereto, a supporting member intermediate said terminal portion and said first portion connected to said plow beam, said supporting member supportably and slidably retaining said bars, and a further group of outwardly extending bars also supported by said supporting member, the surface presented by said first mentioned bars and said further mentioned bars conforming substantially to a moldboard shape.

8. A moldboard for a plow which includes a plow share comprising a plurality of resilient bars which are disposed adjacent one another and are secured at one end near said plow share, a supporting member for said bars, said supporting member arranged to be secured to a fixed part of said plow and to extend tranversely to said bars, each of said bars being supported and slidably retained by said supporting member at a point spaced from the free ends of the bars so that a portion of each of said bars extends beyond said supporting member.

9. A moldboard for a plow which includes a plow share comprising a plurality of bars which are disposed adjacent one another and are secured at one end near said plow share wherein a portion intermediate the ends of each bar is bent through an angle of 360° so that a loop is formed through which a supporting member may be taken, each bar being supported and slidably retained by said supporting member.

10. A plow which comprises a plow share, a series of resilient bars, each of said bars having a substantially straight first portion extending from said plow share, a curved second portion, a substantially straight third portion, a terminal portion, and a loop portion interconnecting said third portion and said terminal portion, the loop portion of each bar forming an elongated convolution that spaces said third and terminal portions apart to form gaps between corresponding portions of said bars, a plow beam extending from said plow share and interconnected thereto, a supporting member intermediate said terminal portion and said first portion supportably and slidably retaining said series of bars by receipt of same in said loop portions of said bars, the surface presented by said bars conforming substantially to a moldboard shape.

11. The invention of clam 10 wherein the lengths of the convolutions are progressively increased.

References Cited in the file of this patent
UNITED STATES PATENTS

| | | |
|---|---|---|
| 83,703 | Fosdick | Nov. 3, 1868 |
| 473,517 | Mitchell et al. | Apr. 26, 1892 |
| 510,125 | Fancher | Dec. 5, 1893 |
| 595,977 | Smith | Dec. 21, 1897 |
| 638,456 | Hansen | Dec. 5, 1899 |
| 797,385 | Troxler | Aug. 15, 1905 |
| 962,646 | Majek | June 28, 1910 |
| 1,604,264 | Donnan | Oct. 26, 1926 |
| 2,841,068 | Takakita et al. | July 1, 1958 |
| 2,913,060 | Owen et al. | Nov. 17, 1959 |